US006950298B2

(12) United States Patent
Edwards et al.

(10) Patent No.: US 6,950,298 B2
(45) Date of Patent: Sep. 27, 2005

(54) MONOLITHIC CAPACITOR ARRAY AND ELECTRICAL CONNECTOR

(75) Inventors: Geoffrey Stephen Edwards, Grange over Sands (GB); William Henderson, Grange over Sands (GB)

(73) Assignee: Oxley Developments Company Limited, Cumbria (GB)

( * ) Notice: Subject to any disclaimer, the term of this patent is extended or adjusted under 35 U.S.C. 154(b) by 272 days.

(21) Appl. No.: 10/306,753

(22) Filed: Nov. 27, 2002

(65) Prior Publication Data

US 2003/0171034 A1 Sep. 11, 2003

(30) Foreign Application Priority Data

Dec. 1, 2001 (GB) ............................................ 0128847

(51) Int. Cl.$^{7}$ .................................................. H01G 4/35

(52) U.S. Cl. ..................... 361/302; 361/306.2; 333/185

(58) Field of Search ................................ 361/302, 303, 361/306.1, 306.2, 306.3, 309, 321.2; 333/183–185

(56) References Cited

U.S. PATENT DOCUMENTS 3,379,943 A 4/1968 Breedlove
4,083,022 A 4/1978 Nijman
4,494,092 A 1/1985 Griffin
5,153,540 A * 10/1992 Gliha, Jr. ..................... 333/182
5,905,627 A 5/1999 Brendel et al.
5,999,398 A * 12/1999 Makl et al. ................. 361/302
6,097,581 A * 8/2000 Anthony ....................... 361/56
6,120,326 A 9/2000 Brooks
6,349,025 B1 * 2/2002 Fraley et al. ............... 361/302

* cited by examiner

*Primary Examiner*—Anthony Dinkins
(74) *Attorney, Agent, or Firm*—Blakely, Sokoloff, Taylor & Zafman; Stephen M. De Klerk

(57) ABSTRACT

A monolithic capacitor array (18) is disclosed which may be suitable for incorporation into a multi-way electrical connector and comprises a dielectric body (20)with a set of through-going cavities (22) for receiving respective connector pins. The cavities are associated with respective capacitors (30, 32) each formed by a first and a second set of capacitor plates (38, 40, 44, 46) interleaved within the dielectric body. The first set of capacitor plates is connectable to ground through a contact (42) at the body's exterior. The second set of capacitor plates is interconnected by metallization of the interior of a connection cavity (62) formed in the dielectric body, the connection-cavity being separately formed form its associated pin-receiving cavity and the metallization therein being contactable from the body's exterior to enable connection of a pin received in the pin-receiving cavity to the second capacitor plates of the associated capacitor.

14 Claims, 2 Drawing Sheets

MONOLITHIC CAPACITOR ARRAY AND ELECTRICAL CONNECTOR

CROSS-REFERENCE TO OTHER APPLICATIONS

This Application claims priority from United Kingdom Patent Application No. 0128847.1, filed on Dec. 1, 2001.

BACKGROUND OF THE INVENTION

The present invention relates to monolithic capacitor arrays. Such arrays may be used, for sample, for suppression of electromagnetic interference (EMI).

It is frequently necessary to suppress EMI (or "noise") in both electronic signal lines and power lines and it is well known to achieve this using capacitive filter circuits, particularly LC circuits.

In applications requiring filtering of several lines, a set of capacitors may be arranged in an array. GB 220520 teaches how such an array can be incorporated in a volumetrically efficient way, in a multi-way connector. Further, the capacitors may be formed in a common, monolithic ceramic body as in the known arrangement illustrated in FIG. 1, wherein the ceramic body is designated by reference numeral 1 and has a plurality of metallised bores 2 through which pass respective connector pins 3. The equivalent filter circuit, for each of the connector pins 3, is illustrated in FIG. 4 and comprises an inductance 50 connected at both ends to the signal line 52 (formed by the connector pin 3) and also through first and second capacitors 54, 56 to ground. Looking again at FIG. 1, first capacitor 54 comprises pin-side plates 5, connected to an upper region of the pin 3 through the metallisation of the hole 2 and interleaved with ground-side plates 7 to be connected through metallisation 9 at the array's outer face, to ground. Similarly second capacitor 56 comprises pin-side plates 11 connected to a lower region of the pin 3 through the metallisation of the hole 2, interleaved with ground-side plates 13 to be connected through the metallisation 9 to ground. The required inductance is provided by virtue of a ferric inductor "core" 15 disposed around the pin 3 in the hole 2.

Constructional difficulties arise because the metallisation of the holes 2 through which the pins 3 pass must be in two isolated sections: an upper part for connection to plates 5 of the first capacitor and a lower part for connection to plates 11 of the second capacitor. Contacting these metallisation to the pins 3 is also problematic and the construction constrains the dimensions of the ferrite.

SUMMARY OF THE INVENTION

In accordance with a first aspect of the present invention there is a monolithic capacitor array comprising a dielectric body having a plurality of though-going cavities for receiving respective connector pins, the cavities being associated with respective capacitors each of which is formed within the dielectric body by a first set of capacitor plates interleaved with a second set of capacitor plates, the first set of capacitor plates being connected to a first contact at the exterior of the dielectric body and so connectable to ground and the second set of capacitor plates being interconnected by metallisation of the interior of a connection-cavity formed in the dielectric body, the connection-cavity being separately formed form the associated pin-receiving cavity and the metallisation therein being contactable from the exterior of the dielectric body thereby enabling a connection to be made from a pin received in one of the pin receiving cavities to the second capacitor plates of the corresponding capacitor.

In a preferred embodiment the metallisation of the connection-cavity leads to a further contact formed by metallisation of a selected region of the exterior of the dielectric body.

Preferably, in such an embodiment, the first contact is formed by metallisation at an outer peripheral surface of the dielectric body and the further contact is formed on a face of the body.

In a further preferred embodiment at least one of the pin-receiving cavities comprises a ferrite component which, in conjunction with the connector pin disposed in the cavity, creates an inductance in order to form an L-C filter circuit.

In yet a further preferred embodiment the said pin-receiving cavity is associated with a pair of capacitors, each capacitor having a set of capacitor plates which are interconnected by virtue of metallisation of the interior of a respective connection cavity, the two connection cavities leading to metallised contacts on opposite faces of the dielectric body, and the pin-receiving cavity leading from one of the faces to the other, whereby when a pin is disposed in the pin-receiving cavity, the two capacitors can be connected thereto on opposite sides of the inductance The capacitor array is particularly suited to incorporation, in accordance with an aspect of the present invention, in an electrical connector to filter the connector's throughput, respective pins being disposed un the pin-receiving cavities of the array and connections between the pins and the array capacitors being formed by means of compliant connectors which embrace the pins.

Preferably the compliant sectors are formed as helical springs into which the pins fit compliantly, free ends of the springs lying against contacts on an adjacent face of the dielectric body.

In accordance with a second aspect of the invention there is an electric connector provided with a filter comprising a monolithic capacitor array comprising a dielectric body having a plurality of through-going cavities through which pass respective connector pins, the cavities being associated with respective capacitors each of which is formed within the dielectric body by a first set of capacitor plates interleaved with a second set of capacitor plates, the first set of capacitor plates being connected to a first contact at the exterior of the dielectric body and so connectable to ground and the second set of capacitor plates being interconnected by metallisation of the interior of a connection-cavity formed in the dielectric body, the connection-cavity in each case being separately formed from the associated pin-receiving cavity and the metallisation therein being contactable from the exterior of the dielectric body thereby enabling a connection to be made from the pin received in the pin receiving cavity to the second capacitor places of the corresponding capacitor.

BRIEF DESCRIPTION OF THE DRAWINGS

A specific embodiment of the present invention is described further hereinafter, by way of example only, with reference to the accompanying drawings, in which.

DETAILED DESCRIPTION OF THE INVENTION

Figure 2:
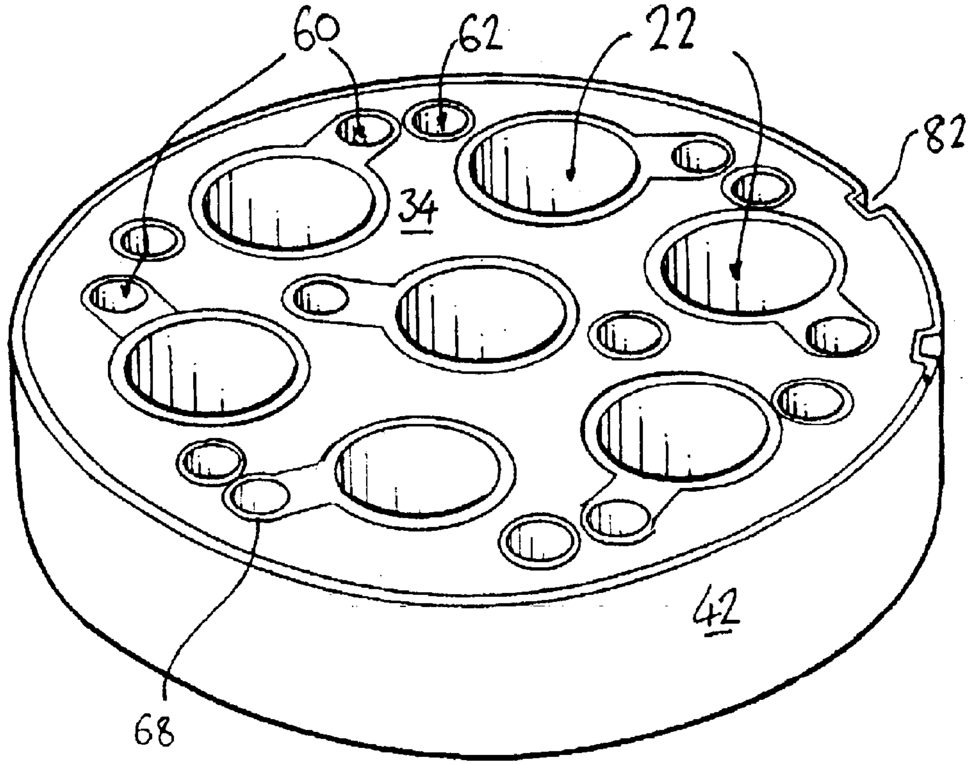
FIG. 2 is a perspective illustration of a capacitor array in accordance with the present invention.
Figure 3:
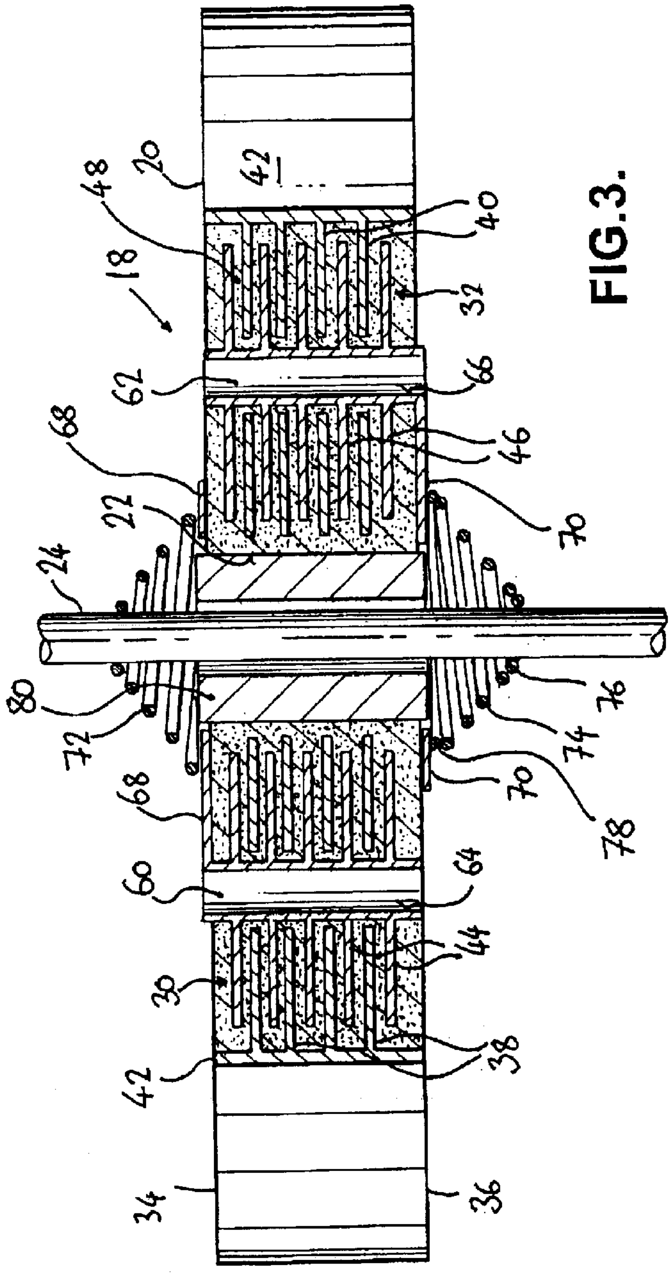
FIG. 3 is a cross section through the same array along the lines A—A of FIG. 2, further showing associated connector pins and a ferrite induction component which are not shown in FIG. 2.

The capacitor array 18 illustrated in FIGS. 2 and 3 comprises a substantially discoidal ceramic body 20 with a set of through-going cavities or bores 22 for receiving respective connector pins, labelled 24 in FIG. 3.

The capacitor array 18 is suitable for incorporation in a multi-way electrical connector in order to filter electrical signals or power supply conducted through the connector. The general principle of incorporating a capacitor array in a multi-way connector, and the construction of such a connector, is illustrated and described in the applicant's earlier UK Patent GB 220520 and will be familiar to the skilled person Consequently it suffices to say that the pins 24 inserted through the pin-receiving bores 22 in the capacitor array 18 are in the pattern required for receipt by a corresponding female connector and serve to make the required electrical connections.

Figure 4:
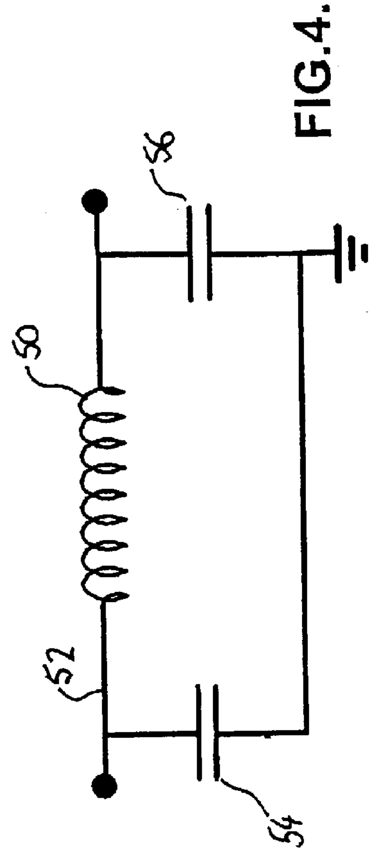
FIG. 4 is a circuit diagram showing the equivalent filter circuit achieved using the arrays of FIGS. 1, 2 and 3.

In the present embodiment each pin has an associated L-C (inductance/capacitance) filter implemented by components disposed within the capacitor array 18. The equivalent electrical circuit is illustrated in FIG. 4 and has been explained above. In other embodiments of course it would be possible to filter only selected pins of the multi-way connector.

Figure 1:
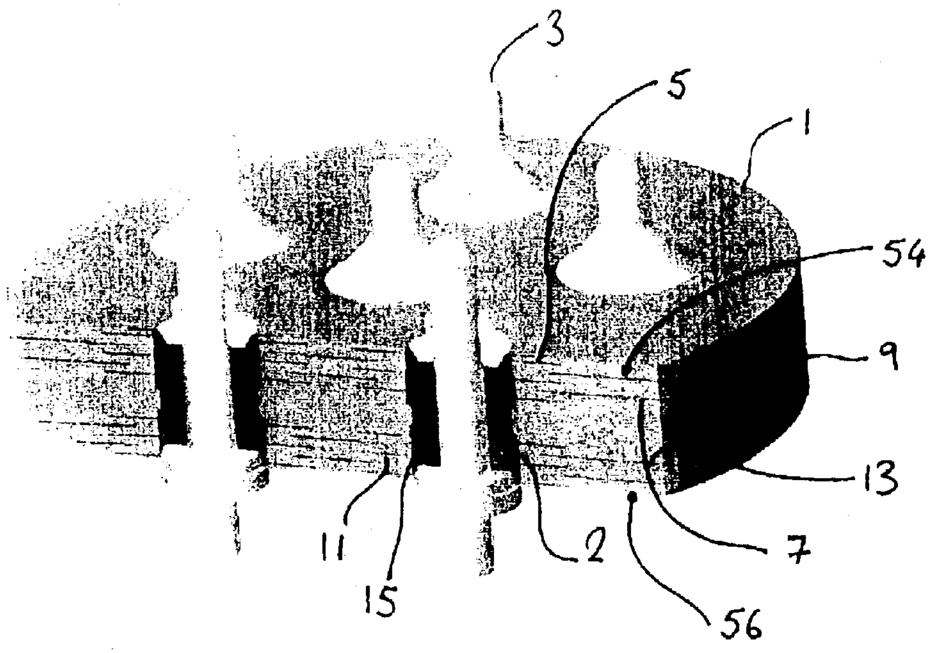
FIG. 1 is a perspective illustration of a known monolithic capacitor array manufactured by the applicant.

In FIG. 3 it can be seen that two capacitors, here labelled 30 and 32 but equivalent to component 54 and 56 of FIG. 4, are associated with a single bore 22 receiving the connector pin 24. The two capacitors 30, 32 are mutual laterally displaced (ie displaced along a direction in which the capacitor plates extend) rather than being vertically displaced (ie displaced in a direction normal to the planes of the capacitor plates) as in the prior art arrangement of FIG. 1. Both capacitors comprise a first set of capacitor plates, 38, 40 respectively, which lead to a metallised layer 42 at the body's periphery serving in the assembled connector as a ground plane. Both capacitors further comprise a second set of capacitor plates 44, 46 interleaved with the first to provide the required capacitance. Intervening layers 48 of the ceramic serve as the capacitor's dielectric. Methods suitable for the fabrication of such structures are familiar to those skilled in the art.

In order to form connections to the second sets 44, 46 of capacitor plates, each capacitor 30, 32 is penetrated by a respective connection-cavity or connection-bore 60, 62. The interiors of both bores are metallised as seen as 64, 66 and this metallisation connects to the capacitor plates 44, 46 respectively therefrom to the body's outer faces. Both metallisations 64, 66 lead to and are formed in a common deposition process with respective pin-side contact 68, 70 formed on opposed faces 34, 46 of the body—that is, one capacitor 30 is connected to a pin-side contact 68 on the body's upper face 34 (the terms "upper" and "lower" are used here for convenience although the orientation of the array is arbitrary) and the other to a pin-side contact on the body's lower face 36.

Connections from the pin 24 to the contacts 68, 70 are achieved by respective compliant connectors 72, 74 formed in the illustrated embodiment as helical springs having a generally tapered, or to be more specific frusto-conical, form. In each case an distal region 76 is of small diameter in order to embrace the pin 24, and is in fact formed with an internal diameter smaller than the external diameter of the pin in order to be compliantly deformed during assembly. A proximal region 78 is of larger diameter to meet the contacts 68, 70 which are laterally separated from the pin 24.

The inductance for the filter circuit is achieved using a ferrite component 80 disposed in the pin-receiving bore 22, around the pin 24.

It will be apparent that by forming connections to the two capacitors on opposite faces of the ceramic body 20, the capacitors are connected on opposite sides of the inductance as in FIG. 4.

Indentations 82 in the periphery of the body 20 allow the ceramic array to be positively located within a suitable electrical connector, the pins of which pass through the bores 22, and are thus protected from electromagnetic interference.

The metallisations 42, 64, 66 are in the above described embodiment formed by plating more specifically by selective electroless plating.

What is claimed is:

1. A monolithic capacitor array comprising a dielectric body having a plurality of through-going cavities for receiving respective connector pins, the cavities being associated with respective capacitors each of which is formed within the dielectric body by a first set of capacitor plates interleaved with a second set of capacitor plates, the first set of capacitor plates being connected to a first contact at the exterior of the dielectric body and so connectable to ground and the second set of capacitor plates being interconnected by metallisation of the interior of a connection-cavity formed in the dielectric body, the connection-cavity being separately formed from the associated pin-receiving cavity and the metallisation therein being contactable from the exterior of the dielectric body thereby enabling a connection to be made from a pin received in one of the pin receiving cavities to the second capacitor plates of the corresponding capacitor.

2. A monolithic capacitor array as claimed in claim 1 wherein the metallisation of the connection-cavity leads to a further contact formed by metallisation of a selected region of the exterior of the dielectric body.

3. A monolithic capacitor array as claimed in claim 2 wherein the first contact is formed by metallisation at an outer peripheral surface of the dielectric body and the further contact is formed on a face of the body.

4. A monolithic capacitor array as claimed in claim 1 wherein at least one of the pin-receiving cavities comprises a ferrite component which, in conjuction with the connector pin disposed in the cavity, creates an inductance and so forms an L-C filter circuit.

5. A monolithic capacitor array as claimed in claim 4 wherein the said pin-receiving cavity is associated with a pair of capacitors, each capacitor having a set of capacitor plates which are interconnected by virtue of metallisation of the interior of a respective connection-cavity, the two connection cavities leading to metallised contacts on opposite faces of the dielectric body, and the pin-receiving cavity leading from one of the faces to the other, whereby when a pin is disposed in the pin-receiving cavity, the two capacitors can be connected thereto on opposite sides of the inductance.

6. A monolithic capacitor array as claimed in claim 1 incorporated in an electrical connector to filter the connector's throughput, respective pins being disposed in the pin-receiving cavities of the array and connections between the pins and the array capacitors being formed by means of compliant connectors which embrace the pins.

7. A monolithic capacitor array as claimed in claim 6 wherein the compliant connectors are formed as helical springs into which the pins fit compliantly, free ends of the springs lying against contacts on an adjacent face of the dielectric body.

8. An electric connector provided with a filter comprising a monolithic capacitor array comprising a dielectric body having a plurality of through-going cavities through which pass respective connector pins, the cavities being associated with respective capacitors each of which is formed within the dielectric body by a first set of capacitor plates interleaved with a second set of capacitor plates, the first set of capacitor plates being connected to a first contact at the exterior of the dielectric body and so connectable to ground and the second set of capacitor plates being interconnected by metallisation of the interior of a connection-cavity formed in the dielectric body, the connection-cavity in each case being separately formed from the associated pin-receiving cavity and the metallisation therein being contactable from the exterior of the dielectric body thereby enabling a connection to be made from the pin received in the pin receiving cavity to the second capacitor places of the corresponding capacitor.

9. An electrical connector as claimed in claim 8 wherein the dielectric body has an outer peripheral surface between first and second major faces and the metallisation of the connection-cavity leads to a further contact formed by metallisation of a selected region of one of the faces of the body.

10. An electrical connector as claimed in claim 9 wherein the first contact is formed at the outer peripheral surface of the dielectric body.

11. An electrical connector as claimed in claim 8 wherein at least one of the pin-receiving cavities comprises a ferrite component which, in conjunction with the connector pin disposed in the cavity, creates an inductance and so forms an L-C filter circuit.

12. An electrical connector as claimed in claim 11 wherein the said pin-receiving cavity is associated with a pair of capacitors, each capacitor having a set of capacitor plates which are interconnected by virtue of metallisation of the interior of a respective connection-cavity, the two connection cavities leading to metallised contacts on opposite faces of the dielectric body, and the pin-receiving cavity leading from one of the faces to the other, whereby the two capacitors are connected to the associated pin on opposite sides of the inductance.

13. An electrical connector as claimed in claim 8 wherein connections between the pins and the capacitors of the array are formed by means of compliant connectors which embrace the pins.

14. An electrical connector as claimed in claim 13 wherein the compliant connectors are formed as helical springs into which the pins fit compliantly, free ends of the springs lying against contacts on an adjacent face of the dielectric body.

* * * * *